(12) United States Patent
Kwon

(10) Patent No.: US 6,584,064 B1
(45) Date of Patent: Jun. 24, 2003

(54) CLAMPING DEVICE OF DISC

(75) Inventor: Chang-Min Kwon, Yongin (KR)

(73) Assignee: DVS Korea Co., Ltd., Sungnam (KR)

( * ) Notice: Subject to any disclaimer, the term of this patent is extended or adjusted under 35 U.S.C. 154(b) by 79 days.

(21) Appl. No.: 09/671,653

(22) Filed: Sep. 28, 2000

(30) Foreign Application Priority Data

Jul. 12, 2000 (KR) ........................................ 2000-39944

(51) Int. Cl.⁷ .............................................. G11B 17/03
(52) U.S. Cl. ..................................................... 369/270
(58) Field of Search ................................. 369/270, 258, 369/261, 271, 75.1, 75.2, 77.1; 360/99.05, 99.08, 99.12

(56) References Cited

U.S. PATENT DOCUMENTS

| | | | | |
|---|---|---|---|---|
| 4,387,454 A | * | 6/1983 | Yamamura et al. | .......... 369/270 |
| 4,390,979 A | * | 6/1983 | Saito et al. | ................. 369/270 |
| 4,786,997 A | * | 11/1988 | Funabashi et al. | ........... 369/270 |
| 5,006,945 A | * | 4/1991 | Furusawa | ................ 360/99.12 |
| 5,824,388 A | * | 10/1998 | Freund et al. | |
| 6,108,294 A | * | 8/2000 | Iwanaga | ..................... 369/270 |
| 6,201,782 B1 | * | 3/2001 | Tanaka et al. | ............... 369/270 |
| 6,275,465 B1 | * | 8/2001 | Shirashima et al. | ........ 369/270 |

* cited by examiner

Primary Examiner—Hoa T. Nguyen
Assistant Examiner—Dzung C. Nguyen
(74) Attorney, Agent, or Firm—Nixon Peabody LLP; Daniel S. Song

(57) ABSTRACT

A clamping device of disc adapted to flatten a defective disc warped in the opposite direction (upward direction) of disc pick-up for enabling an easy reproduction of data recorded in the disc, the clamping device of disc so constructed as to allow a disc placed on a tray to be arranged between a turntable rotor mounted at a deck body and a clamp mounted at a deck cover for clamping, wherein the clamp is integrally formed with a plurality of pressing protruders at an outer periphery and disc pressing surface at an inner periphery to simultaneously press an inner non-recording surface and an outer non-recording surface of the disc accommodated on the turntable rotor.

10 Claims, 4 Drawing Sheets

CLAMPING DEVICE OF DISC

FIELD OF THE INVENTION

The present invention relates to a clamping device of disc (optical recording medium) applied to a compact disc-read only memory (CD-ROM), a CD player, a digital versatile system (DVS), a digital versatile disc ROM (DVD ROM), a digital versatile disc (DVD) play and the like.

DESCRIPTION OF THE PRIOR ART

A clamping device of disc according to the prior art includes, as illustrated in FIG. 1, a spindle motor 10 mounted within a deck body (not shown), a turntable rotor 14 rotably disposed on the spindle motor 10 to be contacted to an inner non-recoding surface 12a formed underneath a disc 12, a clamping york 16 centrally protruded at the turntable rotor 14 to be inserted into a setting hole 12b centrally formed at the disc 12, a clamp 18 for pressing the inner non-recording surface 12a formed on the disc 12 liftably mounted underneath a deck cover (not shown) secured to an upper surface of the body, and a clamping magnet 20 centrally mounted at the clamping 18 for being coupled to the clamping york 16 by magnetic force when the clamp 18 is downwardly checked.

However, there is a problem in the clamping device of disc thus constructed according to the prior art in that only the inner non-recoding surface 12a of the disc 12 is pressed when the clamp 18 presses the disc 12 mounted on the turntable rotor 14, such that the disc 12 cannot be evenly flattened when the disc 12 warped in the opposite (upward) direction of a disc pick-up is placed on the turntable rotor 14 for clamping via the clamp 18, thereby generating a raising phenomenon where outer tracks of the disc 12 are gradually more raised upwards than inner tracks of the disc 12, resulting in improper reproduction of data from the disc 12 due to uneven optical pattern when the rotating bottom recording surface 12c of the disc 12 is reproduced by a reproduction apparatus (not shown).

SUMMARY OF THE INVENTION

The present invention is disclosed to solve the aforementioned problems and it is an object of the present invention to provide a clamping device of disc adapted to flatten a defective disc warped in the opposite direction (upward direction) of disc pick-up for enabling an easy reproduction of data recorded in the disc.

In accordance with the object of the present is invention, there is provided a clamping device of disc, the clamping device of disc so constructed as to allow a disc placed on a tray to be arranged between a turntable rotor mounted at a deck body and a clamp mounted at a deck cover for clamping, wherein the clamp is integrally formed with a plurality of press protruders at an outer periphery and disc pressing surface at an inner periphery to simultaneously press an inner non-recording surface and an outer non-recording surface of the disc accommodated on the turntable rotor.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
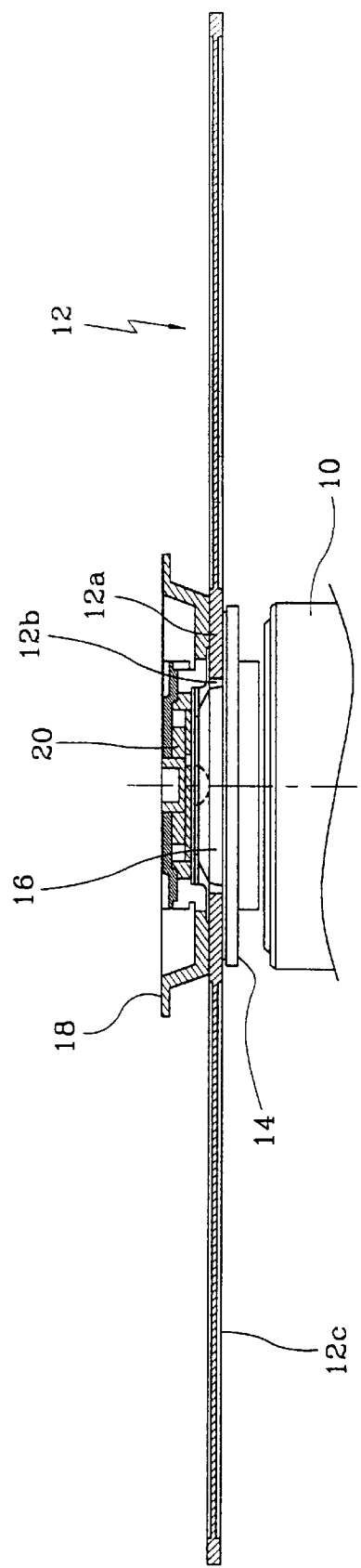
FIG. 1 is a sectional view for illustrating a clamp according to the prior art, pressing a disc located on a turntable rotor.

A preferred embodiment of the present invention will now be described in detail with reference to the accompanying drawings.

Throughout the drawings, like reference numerals and symbols are used for designation of like or equivalent parts or portions as in the prior art for simplicity of illustration and explanation, and redundant references thereto will be omitted.

Figure 2:
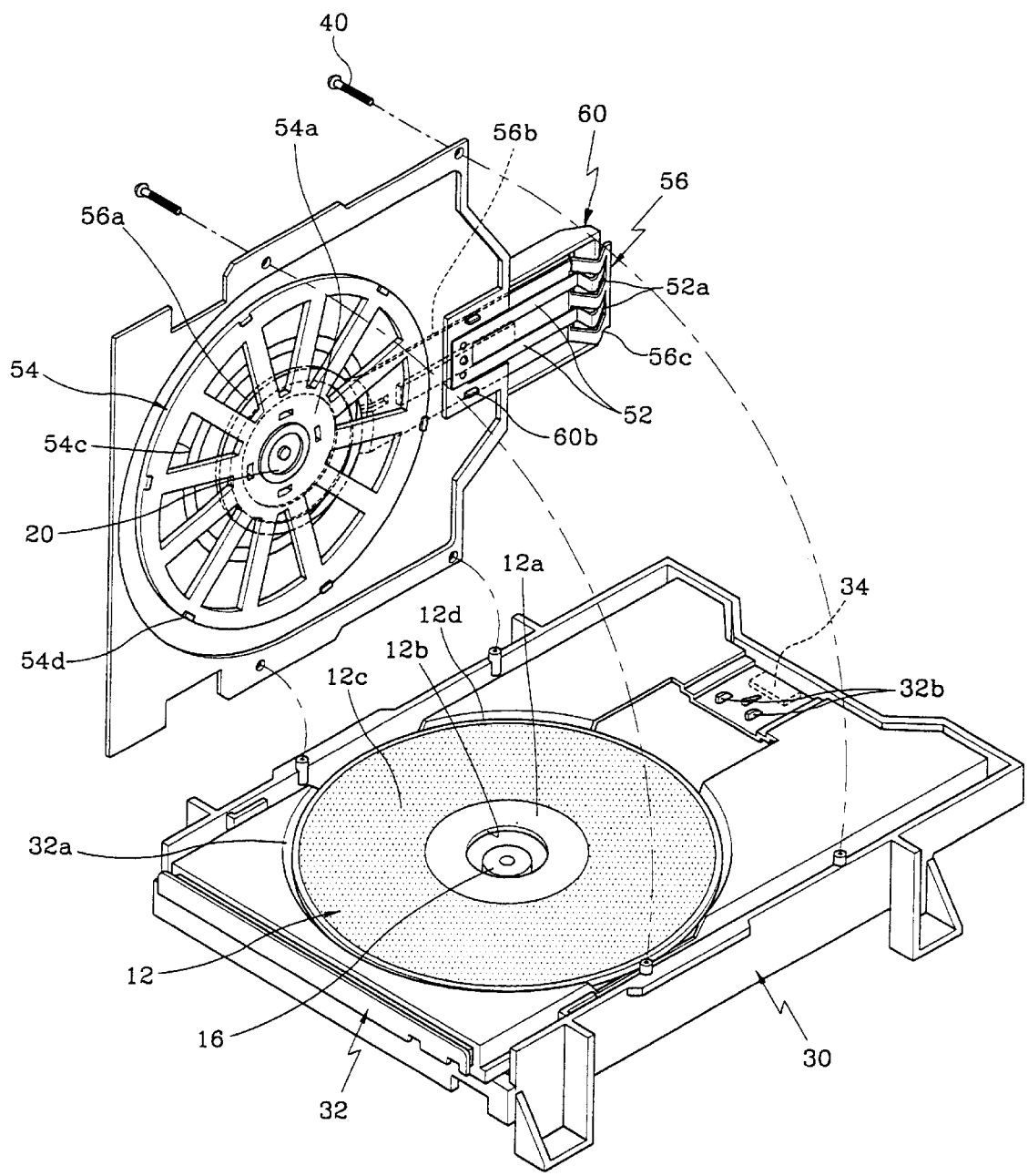
FIG. 2 is an exploded perspective view for illustrating a deck body and a deck cover according to the present invention.
Figure 3:
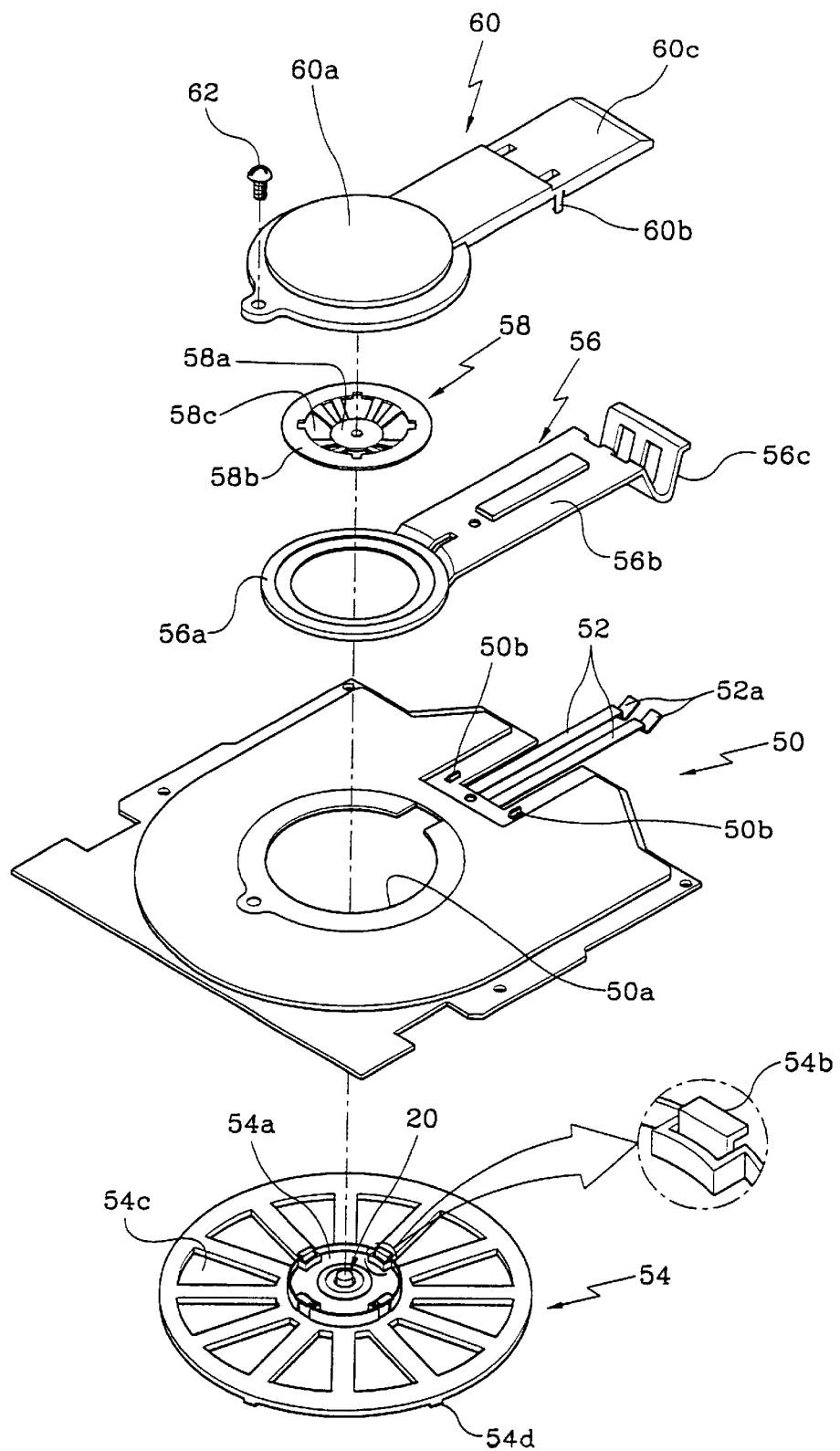
FIG. 3 is a sectional view for illustrating a clamping assembly of the deck cover according to the present invention.
Figure 4:
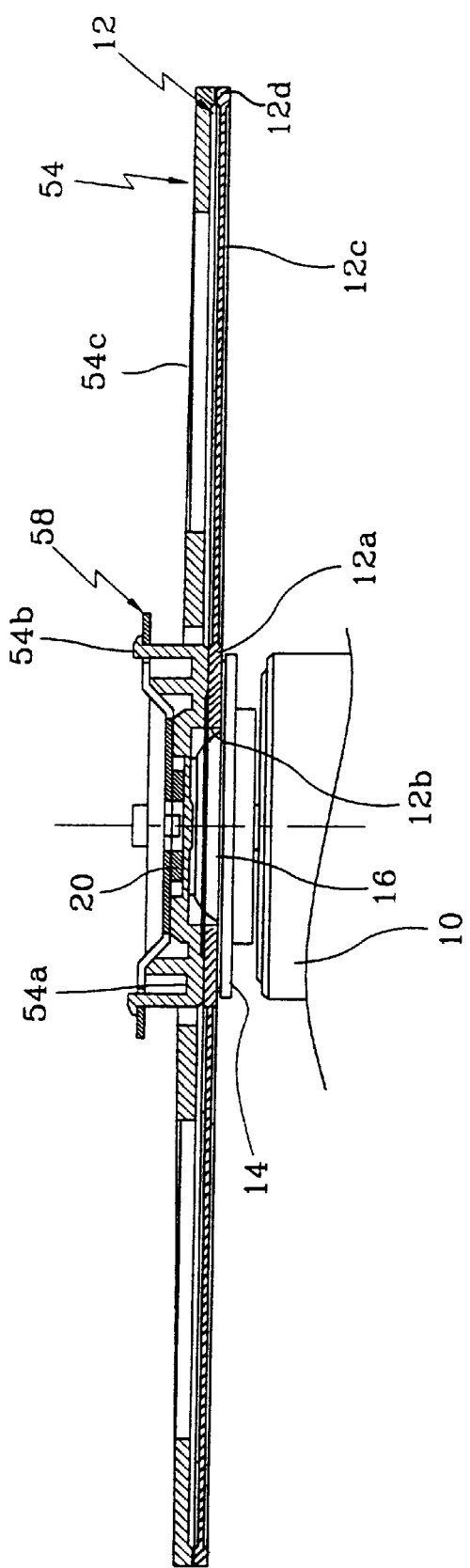
FIG. 4 is a sectional view for illustrating a clamp according to the present invention, pressing a disc placed on a turntable rotor.

A deck according to the present invention includes a deck body 30 and a deck cover 50 nested at an upper opening of the deck body 30 for being coupled by a plurality of coupling nuts 40, as illustrated in FIGS. 2 and 3.

In other words, the deck body 30 is disposed with a tray 32 for being pushed in and pulled out toward a front thereof to accommodate the disc 12 thereon, and is integrally formed at a predetermined height thereof relative to an inner central rear end of the deck body 30 with a protruder 34 in order to support a rear end of the tray 32 lest the rear end of the tray 32 should droop when the tray 32 is pushed in to a predetermined position.

At this time, the tray 32 is formed at a central supper surface thereof with a recess 32a to accommodate the disc 12 and is also integrally disposed at an inner central rear end thereof with a plurality of inclined protruders in order to push upward a rear end of a lever (described later) of the deck cover 50 when the tray 32 is pushed in to stop.

Meanwhile, the deck cover 50 is disposed at a central rear side thereof with a resilient member 52 secured at one side thereof and is provided thereunder with a clamp 54 to correspond with a through hole 50a centrally formed thereon. The deck cover 50 is also formed thereon with a lever 56 hitched by a tip end of the resilient member 52 and downwardly and resiliently supported by a rear end thereof to seesaw from one side as a starting point, and simultaneously corresponding at a tip end thereof to the through hole 50a centrally formed at the deck cover 50.

The lever 56 is arranged at an upper tip end thereof with a plate 58 so as to be hitched by a center portion of the clamp 54 between the lever 56 and the deck cover 50.

At this time, the resilient member 52 is comprised of at least more than two leaf springs where a tip end thereof is fixed thereunder by rivets according to cantilever type relative to a central rear of the deck cover 50, while a rear end thereof is formed with a bent hitcher 52a which pierces an upper surface through a rear bottom surface of the lever 56 to press down a rear end of the lever 56 according to resilience.

The clamp 54 comprised of a plate having an approximately same diameter in size as that of the disc 12 is formed therein with a disc-shaped pressing surface 54a for fixing a clamping magnet 20 and simultaneously contacting a non-recording surface 12a formed at an inner circumference of the disc 12 to press the disc 12. The disc-shaped pressing surface 54a is integrally formed at an upper circumference thereof with a plurality of hook protruders 54b for being oppositely coupled to the plate 58 each at a predetermined space by way of hitching method.

Furthermore, the clamp 54 is provided at a middle circumference thereof with a plurality of cut holes 54c radially formed each at a predetermined space about the disc pressing surface 54a and at positions each divided in a same space and area for reducing the weight of the clamp 54. The clamp 54 is further integrally arranged with a plurality of pressing protruders 54d at lower surface thereof relative to a periphery thereof for being partially touched with the non-recording surface 12d formed at an upper circumference to the disc 12 in order to press the disc 12.

At this time, each pressing protruder 54d is situated at one of the selected positions divided into four equal parts, six equal parts, eight equal parts and twelve equal parts in order to realize a predetermined space and a same height relative to external circumferential bottom surface of the clamp 54.

Each pressing protruder 54d is protruded a step higher than the disc pressing surface 54a.

Each pressing protruder 54d and the disc pressing surface 54a are preferred to protrude within 0.2~0.4 mm, and are further preferred to protrude up to 0.3 mm.

The lever 56 is formed at a tip end thereof with a ring-shaped part 56a to form a concentric circle with the through holes 50a of the deck cover 50 and simultaneously to have a diameter larger enough to prevent from slipping through the through hole 50a.

The lever 56 is also integrally formed at a rear end thereof with a plate part 56b for being accommodated on the upper surface of the deck cover 50 and for a tip end thereof oppositely coupling with hitcher 52a of the resilient member 52 to be downwardly and resiliently supported.

The plate part 56b is formed at a tip end thereof with a bent part 56c for contacting a plurality of slanted protruders 32b protruded on an upper surface of the tray 32 by being bent in a V-shape and for the hitcher 52a of the resilient member 52 to pierce therethrough from under and to ride thereon.

The plate 58 is formed with an inner contact surface 58a, the surface being downwardly protruded at a center portion thereof to correspondingly adhere to the upper surface of the clamping magnet 20. The plate 58 is formed with an outer contact surface 58b more upwardly protruded at an upper periphery thereof than the inner contact surface 58a to adhere to an upper periphery of the ring-shaped part 56a. A coupling hole 58c is radially formed between the inner contact surface 58a and the outer contact surface 58b for a plurality of hook protruders formed on the clamp 54 to correspondingly be hitched and mutually coupled.

The top cover 60 is formed at a tip end thereof with a disc part 60a for being overlapped on an upper surface of the deck cover 50 in between the ring-shaped part 56a of the lever 56 and the plate 58 so as to be fixed at one end thereof by a fastening nut 62. The top cover 60 is extensively and integrally formed at a rear end thereof with plate part 60c having a plurality of coupling protruders 60b at a side thereof for being overlapped on the deck cover 50 with the plate part 56b of the lever 56 situated at a side thereof and for being coupled by hitching method in opposition to a plurality of coupling holes 50b formed at one side of the deck cover 50.

Now, operational effect of the present invention thus constructed will be described.

When the tray 32 is pulled forward from the deck body 30 and the disc 12 is placed on the recess 32a formed on the tray 32 and then the tray 32 is pulled in, the hole at the center of the recess 32a automatically corresponds with a rotary center of a clamping york 16 mounted at a predetermined inner area of the deck body 30 and simultaneously corresponds with a rotary center of a setting hole 12b of the disc 12 formed at the recess 32a.

At this time, when the tray 32 is pulled into the deck body 30 and maintains a stationary state, a rear end of the tray 32 hits an inner rear wall of the deck body 30 to be accommodated at an upper area of the support protruder 34 integrally formed at an inner rear center of the deck body 30, such that a rear center of the tray 32 can be supportively prevented from drooping.

Furthermore, the plurality of slanted protruders 32b formed at an upper center rear end of the tray 32 hit the bent part 56c of the lever 56 at the deck cover 50 to push upwards the plate part 56b at a rear end of the lever upto as high as the plurality of slanted protruders 32b when the tray 32 is pushed in, where the lever 56 seesaws about a middle section of the plate part 56b to lower a ring-shaped part 56a formed at a tip end thereof and the clamp 54 is simultaneously descended according to the lowering movement of the ring-shaped part 56a.

In other words, the clamp 54 adheres to a lower surface of the ring-shaped part 56a at the lever 56 formed on the deck cover 50 from the bottom side of the through hole 50a at the deck cover 50, and the clamp 54 is so constructed as to be hitched to the plate 58 positioned on the ring-shaped part 50a by way of hitching method, such that when the ring-shaped part 56a formed at the tip end of the lever 56 is descended, the clamp 54 is also lowered simultaneously. Successively, the clamping magnet 20 centrally secured at the clamp 54 is attached by magnetic force to the clamping york 16 protrusively formed on the table rotor 14 through the setting hole 12b centrally formed at the disc 12.

Furthermore, the disc pressing surface 54a formed at an inner side of the clamp 54 and the plurality of pressing protruders 54d formed thereoutside are simultaneously lowered, where the disc pressing surface 54a of the clamp 54 is lowered towards turntable rotor 14 to press the inner non-recording surface 12a relative to the upper surface of the disc 12 and simultaneously strongly clamps the inner non-recording surface 12a of the disc 12 formed between the disc pressing surface 54a and the turntable rotor 14. The plurality of pressing protruders 54d at the clamp 54 press the outer non-recording surface 12a relative to the upper surface of the disc 12.

At this time, the plurality of pressing protruders 54d and the disc pressing surface 54a are equally protruded upto as high as 0.3 mm from the lower surface of the clamp 54, such that when the clamp 54 is descended to press the disc 12, the plurality of pressing protruders 54d and the disc pressing surface 54a can first contact the inner non-recording surface 12a and the outer non-recording surface 12d of the disc 12.

Successively, when the discrepant disc 12 warped upwards is loaded on the turntable rotor 14, the plurality of pressing protruders 54d and the disc pressing surface 54a formed at the clamp 54 simultaneously and forcibly press the inner non-recording surface 12a and the outer non-recording surface 12d at the upper side of the disc 12 according to the force generated by the lowering clamp 54 to flatten the upwardly-warped discrepant disc 12, and simultaneously data recorded on the recording surface 12c of the disc 12 can be accurately reproduced according to driving of the reproducing device.

As apparent from the foregoing, there is an advantage in the clamping device of disc thus described according to the present invention in that an inner non-recording surface and an outer non-recording surface relative to an upper surface of a disc are simultaneously pressed when the disc trayed and placed on a turntable rotor is clamped by a clamp, such that a discrepant disc upwardly warped (in the opposite direction of pickup of the disc) can be flattened to enable an easy reproduction of data recorded in the disc.

What is claimed is:

1. A clamping device for a disc constructed to allow a disc placed on a tray to be arranged between a turntable rotor mounted at a deck body and a clamp mounted at a deck cover for clamping, wherein the clamp is formed with a plurality of pressing protruders at an outer periphery of the clamp, and a disc pressing surface at an inner periphery of the clamp, the disc pressing surface pressing an inner non-recording surface of the disc, and the plurality of pressing protruders pressing an outer peripheral circumference of a non-recording surface of the disc accommodated on the turntable rotor simultaneously with the disc pressing surface at the inner periphery of the clamp.

2. The device as defined in claim 1, wherein each pressing protruder is protrusively dispersed at a predetermined space along the outer periphery of the clamp and protrude at a same height from a lower surface of the clamp so as to partially contact the non-recorded surface formed at an upper periphery of the disc.

3. The device as defined in claim 1, wherein each pressing protruder is situated at one of the selected positions divided into four equal parts, six equal parts, eight equal parts and twelve equal parts at a lower surface of the clamp.

4. The device as defined in claim 1, wherein each pressing protruder and the disc pressing surface are preferred to protrude upto within 0.2~0.4 mm from a lower surface of the clamp.

5. The device as defined in claim 1, wherein the clamp is radially formed at a middle circumference thereof with a plurality of cut holes to reduce weight of the clamp.

6. The device as defined in claim 1, wherein the deck body is integrally formed at an inner rear end thereof with a support protruder in order to prevent a rear end of the tray from drooping downwards when the tray is pushed in at a predetermined position maintains a stationary state.

7. The device as defined in claim 1, wherein the tray is integrally formed at an upper rear end thereof with a plurality of slanted protruders in order to push a rear end of a lever connected to the clamp and to downwardly operate the clamp when the tray is pushed in and maintains a stationary state.

8. The device as defined in claim 1, wherein a lever is resiliently and downwardly supported at a rear end thereof by a resilient member secured at one side of the deck cover so as to seesaw on an upper lateral point of the deck cover.

9. The device as defined in claim 7, wherein the lever is formed downwardly at the rear end thereof with a bent part to allow the plurality of pressing protruders to correspondingly contact when the tray is pushed in.

10. The device as defined in claim 7, wherein the lever is resiliently and downwardly supported at the rear end thereof by a resilient member secured at one side of the deck cover so as to seesaw on an upper lateral point of the deck cover.

* * * * *